United States Patent [19]

Mater et al.

[11] Patent Number: 5,118,558
[45] Date of Patent: Jun. 2, 1992

[54] LAMINATE MATERIAL PARTICULARLY ADAPTED FOR HULL OF AEROSTATS

[75] Inventors: Charles E. Mater, Dover; Michael J. Kinnel, Hartly, both of Del.

[73] Assignee: ILC Dover, Inc., Frederica, Del.

[21] Appl. No.: 480,954

[22] Filed: Feb. 16, 1990

[51] Int. Cl.⁵ .............................................. B32B 7/00
[52] U.S. Cl. ................................... 428/252; 244/31; 428/246; 428/265
[58] Field of Search ............. 428/260, 265, 272, 483, 428/252, 423.7, 246; 244/31

[56] References Cited

U.S. PATENT DOCUMENTS

| | | | |
|---|---|---|---|
| 3,519,530 | 7/1970 | Struble, Jr. | 161/129 |
| 4,020,209 | 4/1977 | Yuan | 428/272 |
| 4,762,295 | 8/1988 | Yon, Jr. | 244/115 |

Primary Examiner—James J. Bell
Attorney, Agent, or Firm—Stevens, Davis, Miller & Mosher

[57] ABSTRACT

A novel composite material in the form of a laminate is disclosed which has particular utility for forming gas-holding structures such as hull structures of aerostats. The laminate is composed of plies wherein a polyester fabric/strength member which is woven from a polyester yarn having low shrinkage, laminated to an amorphous, thermoplastic polyester film that provides distortion and shrinkage resistance during manufacture of the composite and fabrication into hull structures of an aerostat. The composite utilizes a thermoplastic polycarbonate polyurethane film on each side of the fabric to provide a dual gas barrier, weatherability, and a wear layer. The hull structure can be fabricated by radio frequency, thermal heating or adhesive cement techniques to provide structural seams on either side of the laminate material.

17 Claims, 1 Drawing Sheet

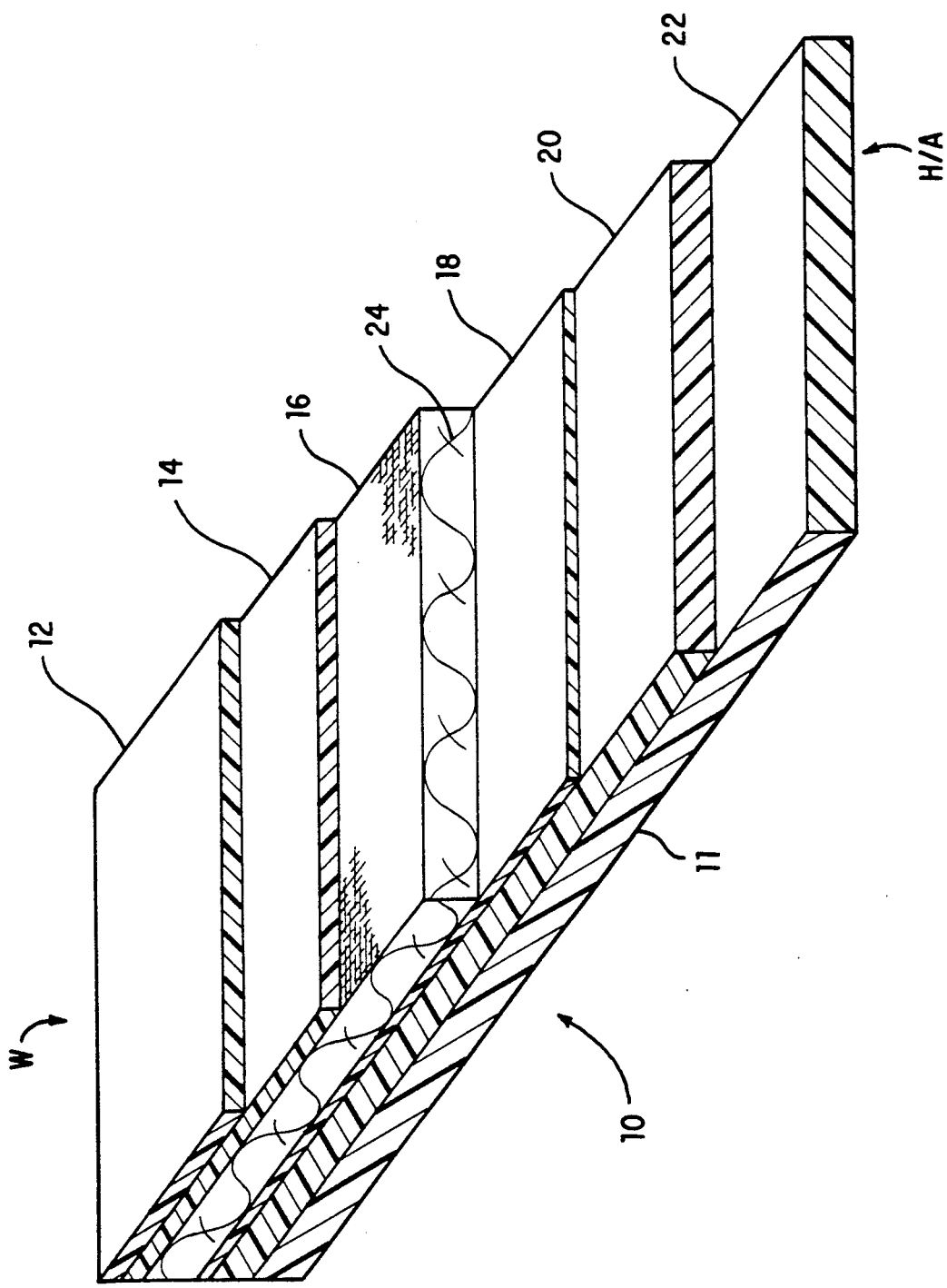

LAMINATE MATERIAL PARTICULARLY ADAPTED FOR HULL OF AEROSTATS

BACKGROUND OF THE INVENTION

This invention relates to a laminated aerostat material and an aerostat formed of such materials.

Aerostats are lighter-than-air inflatable balloons comprising a hull fabricated from sheet material and further including fins located at the tail of the hull for aerodynamic stability.

Aerostats are disclosed, for example, in U.S. Pat. Nos. 3,519,530 and 4,762,295, the entire disclosures of which are each incorporated by reference herein.

The sheet material used to form the hull of prior art aerostats has evolved to encompass a laminate material with or without strengthening filaments or metal foil layers. For example, the aforementioned U.S Pat. No. 3,519,530 discloses that two thermoplastic sheets can be pressed together under the influence of heat to embed strength filaments between them. Prior to or subsequent to this embedding operation, the thermoplastic sheets may be coated with an adhesive on their exterior sides and then laminated to sheets of non-thermoplastic material. Such non-thermoplastic material may comprise Mylar ®, or other similar plastic, or metal foil such as aluminum foil. Among suitable thermoplastic materials are disclosed polyethylene, polypropylene, polyvinyl materials, such as polyvinyl acetates and polyvinyl chlorides, nylon, etc.

Other prior art laminates are difficult to fabricate into the hull structure of aerostats. Difficulties in adhering the various plies of the laminate to one another, as well as to themselves, is not only difficult but significantly increases production costs but also makes it necessary to make all attachments to the aerostat hull through the fabric of the hull, rendering the construction prone to puncture and flex-cracking.

The aforementioned U.S. Pat. No. 4,762,295 discloses a laminate material comprising an outer coating of light-stable white pigmented polyester polyurethane applied onto a layer which is formed from 4.1 ounce/yard$^2$ polyester woven fabric. The next inner layer is a coating of black pigmented polyester polyurethane with a further inner layer of non-woven oriented fiber polyester fabric. The innermost layer is a coating of a black pigmented polyether polyurethane. This material has a helium holding layer on only one side and its bias stability is poor.

Other prior art attempts to make hull structures with two-ply fabrics, generally with one ply biased at 45° to provide dimensional stability (an example of which is The Goodyear Blimp). These structures are expensive due to the need for biasing, have a low strength/weight ratio, and frequently have ply separation problems.

Thus, there exists a long-standing need for a multi-layered laminate material which has particular utility for a gas-holding function as arises in the field of aerostats and which is free of the problems of the prior art materials.

OBJECTS OF THE INVENTION

A first object of the present invention is to overcome the long-standing problem in the art by providing a multi-layered laminate material which comprises a woven fabric formed from low-shrinkage, high-tenacity polyester yarn combined with a high-modulus thermoplastic polyester film.

It is a further object of the present invention to provide a dual gas-holding multi-layered laminate structure of improved physical properties.

It is a further object of the present invention to provide a hull structure for aerostats embodying the novel multi-layered laminate materials of the present invention.

These and further objects of the invention will become apparent from the following detailed description of the invention.

SUMMARY OF THE INVENTION

This invention is directed to a multi-layered laminate material comprising a fabric woven from low-shrinkage, high-tenacity polyester yarns combined with a high-modulus thermoplastic polyester film as one of the laminate. Other plies can be formed of thermoplastic polyurethane films. These polyester and polyurethane films can be formed of polymers to which additives for ultraviolet stability, micro-organism resistance, and hydrolytic stability have been added. The laminate material of the invention exhibits excellent physical properties which are a combination of a unique fabric, laminated to a thermoplastic polyester film, and improved thermoplastic urethane formulations which permit the utilization of thermoplastic film forming techniques to form the laminate as well as facilitating tho fabrication of the laminate into a gas-holding structure, such as the hull structure of an aerostat.

In alternative embodiments, a fabric, such as one having a 17×17 yarn count, is impregnated with a thermoplastic polyester, such to prevent yarn distortion during processing. However, the impregnate of the fabric is not an indispensible feature of the invention as fabrics having a yarn count of 24×24 can be processed as a ply of the laminate without the need for impregnation.

BRIEF DESCRIPTION OF THE DRAWINGS

The sole figure is a schematic, perspective view, partially in cross-section, of a portion of the hull structure of an aerostat wherein the various plies of the laminate forming the hull structure can be clearly differentiated.

DETAILED DESCRIPTION OF THE INVENTION

As can be seen from the drawing figure, a portion of the hull structure of an aerostat, shown partially in cross-section, is depicted generally at 10, wherein W is the weather side (sometimes called "white side") of the aerostat and H/A is the helium or air side (sometimes called "black side") of the hull structure. The hull structure 11 is comprised of a plurality of plies, numbered 12 through 22 (collectively referred to as "a laminate"). The outermost ply 12 adjacent the weather side of the aerostat is formed of a thermoplastic, light-stable polycarbonate-type polyurethane optionally containing a filler imparting a white color. This white filler provides ultraviolet stability. Other additives to improve the micro-organism resistance and hydrolytic stability of the ply 12 may be included.

Ply 14 is a basecoat-polyether-type polyurethane optionally containing a filler imparting a white color and an adhesion promotor.

Ply 16 is a polyester fabric/strength layer which is formed of a fabric 24 woven from low-shrink, high-denier polyester yarn which is optionally impregnated with a high-modulus amorphous thermoplastic polyester solution. It is within the scope of the invention to employ various yarn counts having varying tensile strengths to produce a ply 16 having sufficient strength to satisfy the requirements of the particular aerostat hull structure being fabricated.

As a suitable polyester yarn, applicants have employed a polyester yarn obtained from Celanese-Hoechst as Type 710 polyester yarn which has very low shrinkage. This polyester yarn has the combination of lowest shrinkage and highest tenacity of any commercially available polyester yarn, the employment of which prevents distortion and shrinkage of the composite during the steps of manufacture of the laminate as well as subsequent fabrication of the laminate into a hull structure. Applicants have found that the use of this yarn also provides much higher adhesion values to the laminate than other polyester yarns.

A polyester film 20 is laminated to the polyester fabric 24 from the H/A (or black) side. Applicants have found that an amorphous polyester unexpectedly improves the resultant laminate material. The prior art has used polyester films, such as Mylar ®, which is a highly crystalline polyester material. Applicants have found that an amorphous polyester such as that sold by Eastman Plastics under the trademark KODAR PETG Copolyester 6763 is not only soluble but thermoplastic in nature. These properties greatly improve the compatibility and adhesion of the various plies of the laminate to which they are adjacent as well as simplifying fabrication of the resultant laminate into the hull structure of an aerostat. The primary function of the woven fabric 24 laminated with the PETG film is to provide bias stability as well as higher adhesion values to the thermoplastic polyurethane plies adjacent ply 20. This high degree of adhesion is a critical requirement of laminates in order to prevent de-lamination of plies of the resultant laminate during use.

KODAR PETG Copolyester 6763 is described in the Eastman Plastics Publication No. MB-80A, the entire contents of which are herein incorporated by reference. The properties of a film formed from this material are described in Table 1:

TABLE 1

| Property, conditions, units | ASTM Test Method | Value of Property |
| --- | --- | --- |
| Thickness of film tested, mils | — | 10 |
| um | | 250 |
| Density, g/cm$^3$ | D 1505 | 1.27 |
| Haze, % | D 1003 | 0.5 |
| Gloss at 45°, Gardner rating | D 2457 | 108 |
| Transparency, % | D 1746 | 60 |
| Elmendorf Tear Strength, g | | |
| M.D. | D 1922 | 125 |
| D.D. | | 125 |
| Tensile Strength at Yield | | |
| M.D., psi | | 6900 |
| MPa | | 48 |
| T.D., psi | | 7000 |
| MPa | | 48 |
| Tensile Strength at Fracture | | |
| M.D., psi | D 882 | 7300 |
| MPa | | 50 |
| T.D., psi | | 7000 |
| MPa | | 48 |
| Tensile Modulus of Elasticity | | |
| M.D., 10$^5$ psi | | 2.5 |

TABLE 1-continued

| Property, conditions, units | ASTM Test Method | Value of Property |
| --- | --- | --- |
| MPa | | 1720 |
| Coefficient of Friction, film-to-film | D 1894 | >1.0 |
| Water-Vapor Transmission Rate g/24 h-m$^2$ | E 96E | 6 |
| Gas Transmission Rate cm$^3$-mm/24 h-m$^2$-atm | | |
| for $CO_2$ | D 1434 | 30 |
| for $O_2$ | | 10 |
| for $N_2$ | | 5 |
| Impact Strength, ½-in. (13-mm) dart at 26 in. (660 mm), g | | |
| at 73° F. (23° C.) | D 1709 | 425 |
| at 32° F. (0° C.) | Modified | 400 |
| at 9° F. (−18° C.) | | 350 |

All tests not otherwise noted were run at 73° F. (23° C.) and 50% relative humidity.

Ply 18 is similar to ply 14 and is formed of a basecoat-polyether-type polyurethane optionally having a filler imparting a white color. As with ply 14, it may contain additional additives to improve its resistance to micro-organism and hydrolytic stability. The addition of additives to promote chemical adhesion can also be used.

Applicants have found that a suitable material for forming plies 14 and 18 can consist of a polyether-based solution polyurethane marketed by the Polyurethane Corporation of America, Polyurethane Specialties Company, Inc., of Lyndhurst, N.J., under the tradename Milloxane BC 400. Milloxane BC 400 forms heat-sealable, hydrolytically stable coatings with excellent low temperature properties exhibiting low air and gas permeability, and has the following solution and film properties as set forth in Table 2.

TABLE 2

| SOLUTION PROPERTIES: | |
| --- | --- |
| Solids Content, % | 35 |
| Visc. @ 25° C., cps. | 30–40,000 |
| Solvent System, % by wgt. | DMF/TOL/MEK 65/25/10 |
| FILM PROPERTIES: | |
| 100% modulus, psi | 700 |
| 200% modulus, psi | 1000 |
| 300% modulus, psi | 1700 |
| Tensile at break, psi | 6000 |
| Ultimate Elongation, % | 625 |

Ply 20 comprises an amorphous polyester film which is preferably formed of the same type of polyester as used in ply 16. The inner ply 22, adjacent the helium or air (black) side of an aerostat is formed of a polycarbonate-type polyurethane optionally employing a filler which imparts a black color. As with all the other plies in laminate 11, additional additives may be employed to improve the micro-organism resistance and hydrolytic stability of ply 22.

Ply 22 as with ply 12 is an polycarbonate urethane compounded for maximum service life, and manufactured by casting a film from solution onto a release surface, removing it and post-laminating it to the composite of plies 12–20. The procedure allows custom compounding and, by using film lamination instead of solution coating, a uniform and very light weight film can be formed and, if desired, applied to coarse yarns to render the composite laminate 11 gas-holding. An example of such a polyurethane coating is a polymer marketed under the tradename U-26-250 Super Polymer by Permuthane Coatings of Peabody, Mass. This material possesses super hydrolytic stability along with excellent flex life, excellent wear resistance, excellent resistance to chemicals and very good long-term aging properties. The typical physical properties of this material are identified in Table 3 below.

TABLE 3

| TYPICAL PHYSICAL PROPERTIES | |
| --- | --- |
| Appearance: | Clear to Light Haze |
| Viscosity: | 20,000-30,000 cps @ 25° C. |
| Solids Content: | 30% ± 1% |
| Flash Point: | 41° F. |
| Type of Polymer: | Aliphatic Urethane |
| Cleaning Solvent: | T-39, Methyl Cellosolve or DMF |
| Thinner Required: | DMF |
| Tensile at Break (psi): | 6125 |
| Ultimate elongation (%): | 415 |
| 100% Modulus (psi): | 1370 |
| 300% Modulus (psi): | 3800 |

Applicants' initial tests have determined that the polyester film utilized in the present invention results in very high adhesion not typically associated with polyester films. Although not being bound by the mechanism of the adhesion, applicants believe that a chemical attachment of the base woven fabric 24 and other components of the laminate to the polyester film occurs to produce typical adhesions of 10-15 pounds/inch.

The laminate 11 of the present invention can be formed by laminating a preformed ply 22 to a built-up composite of plies 12-20 at temperatures of about 380° F. and 500 psi. The resulting laminate can be fabricated into a hull structure of an aerostat by the formation of structural seam seals on either side of the fabric by heat sealing. Alternative methods of fabrication can be by radio frequency heating or by the use of an adhesive cement.

The resultant hull structure 10 is dimensionally stable, possesses gas-holding properties on both sides of the fabric, has very high adhesion values, excellent flex life and puncture resistance, and can be fabricated by radio frequency, thermal and cement methods.

From the foregoing description of the invention, it should be understood that suitable alternative elements can be substituted for those disclosed without departing from the invention which is limited only by the scope of the appended claims.

We claim:

1. A multi-layered laminate material comprising a ply formed of woven fabric formed from a low-shrinkage polyester yarn impregnated with a high-modulus, amorphous, thermoplastic polyester,
    said ply bonded on at least one side to a polyether-type polyurethane resin containing ply.

2. The multi-layered laminate of claim 1 wherein the laminate further comprises light-stable polycarbonate-type polyurethane layers as its exposed surfaces.

3. The multi-layered laminate of claim 2 wherein the laminate is formed into a hull structure for an aerostat.

4. The multi-layered laminate of claim 3, wherein one side of said exposed surfaces is in contact with a gas selected from the group consisting of helium and air and said polycarbonate-type polyurethane layer adjacent said gas contains a filler imparting a black color to said layer.

5. The multi-layered laminate of claim 4 wherein the exposed surface remote from said layer adjacent said gas contains a filler imparting a white color thereto.

6. The multi-layered laminate of claim 4 wherein said exposed surface is in contact with a ply comprising an amorphous, thermoplastic polyester film.

7. The multi-layered laminate of claim 6 wherein the polyester of said ply is the same as the polyester impregnating the polyester yarn in the woven fabric-containing ply.

8. The multi-layered laminate of claim 6 further containing a ply of polyether-type polyurethane positioned between said woven fabric-containing ply and said ply comprising an amorphous thermoplastic polyester.

9. The multi-layered laminate of claim 5 further containing a ply of polyether-type polyurethane between said exposed surface and said woven fabric-containing ply.

10. The multi-layered laminate of claim 9 further including at least one additive to increase the hydrolytic stability of at least one ply thereof.

11. The multi-layered laminate of claim 9 further including at least one additive to increase the microorganism resistance of at least one ply thereof.

12. The multi-layered laminate of claim 5 further including at least one additive to increase the ultraviolet stability of at least one ply thereof.

13. A hull material for an aerostat formed from the laminate material of claim 1.

14. A hull material for an aerostat formed from the multi-layered laminate material of claim 1.

15. A laminate material comprising exposed surfaces of plies of a polycarbonate-type polyurethane resin, one of said plies containing a filler imparting a white color and the other of said plies containing a filler imparting a black color; said laminate further comprising the following plies, in the order stated, between said white colored and said black colored exposed surfaces:
    a polyether-type polyurethane ply;
    a woven fabric of a polyester yarn having low shrinkage, said woven fabric optionally impregnated with a high-modulus, amorphous, thermoplastic polyester solution;
    a polyether-type polyurethane ply; and
    a polyester film ply comprising an amorphous thermoplastic polyester resin.

16. A hull construction for an aerostat comprising the laminate material of claim 15.

17. A hull construction for an aerostat as claimed in claim 16 wherein structural seams are formed on at least one of said exposed surfaces by radio frequency, thermal or adhesive cement methods.

* * * * *